US006973491B1

(12) United States Patent
Staveley et al.

(10) Patent No.: US 6,973,491 B1
(45) Date of Patent: Dec. 6, 2005

(54) SYSTEM AND METHOD FOR MONITORING AND MANAGING SYSTEM ASSETS AND ASSET CONFIGURATIONS

(75) Inventors: Marc Staveley, Buckhorn (CA); Dean Kemp, Superior, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 924 days.

(21) Appl. No.: 09/635,823

(22) Filed: Aug. 9, 2000

(51) Int. Cl.[7] ............................................. G06F 15/16
(52) U.S. Cl. ...................................... 709/224; 709/223
(58) Field of Search ................................ 709/223, 224, 709/202

(56) References Cited

U.S. PATENT DOCUMENTS

| | | | | |
|---|---|---|---|---|
| 5,583,859 | A | * | 12/1996 | Feldmeier ................... 370/471 |
| 5,732,275 | A | * | 3/1998 | Kullick et al. .............. 717/170 |
| 5,742,762 | A | * | 4/1998 | Scholl et al. ............... 709/200 |
| 5,758,071 | A | * | 5/1998 | Burgess et al. ............. 709/220 |
| 5,828,830 | A | * | 10/1998 | Rangaraian et al. .......... 714/48 |
| 5,905,868 | A | * | 5/1999 | Baghai et al. .............. 709/224 |
| 5,958,009 | A | * | 9/1999 | Friedrich et al. ........... 709/224 |
| 5,978,845 | A | * | 11/1999 | Reisacher ................... 709/223 |
| 6,049,828 | A | * | 4/2000 | Dev et al. .................. 709/224 |
| 6,052,819 | A | * | 4/2000 | Barker et al. ............... 714/776 |
| 6,108,782 | A | * | 8/2000 | Fletcher et al. ............. 713/153 |
| 6,115,743 | A | * | 9/2000 | Cowan et al. ............... 709/224 |
| 6,182,157 | B1 | * | 1/2001 | Schlener et al. ............ 719/318 |
| 6,244,758 | B1 | * | 6/2001 | Solymar et al. ............. 709/224 |
| 6,282,175 | B1 | * | 8/2001 | Steele et al. ................ 370/254 |
| 6,289,378 | B1 | * | 9/2001 | Meyer et al. ............... 709/223 |
| 6,327,620 | B1 | * | 12/2001 | Tams et al. ................. 709/224 |
| 6,327,677 | B1 | * | 12/2001 | Garg et al. .................. 714/37 |
| 6,397,245 | B1 | * | 5/2002 | Johnson et al. ............. 709/203 |
| 6,401,119 | B1 | * | 6/2002 | Fuss et al. .................. 709/224 |
| 6,405,251 | B1 | * | 6/2002 | Bullard et al. .............. 709/224 |
| 6,446,123 | B1 | * | 9/2002 | Ballantine et al. .......... 709/224 |
| 6,487,590 | B1 | * | 11/2002 | Foley et al. ................ 709/223 |

(Continued)

OTHER PUBLICATIONS

Baldi et al., "Exploiting code mobility in decentralized and flexible network management", in Proceedings of the 1st International Workshop on Mobile Agents, Berlin, Germany. Apr. 1997.*

Primary Examiner—William A. Cuchlinski, Jr.
Assistant Examiner—Yemane Mesfin Gerezgiher
(74) Attorney, Agent, or Firm—Kent A. Lembke; Williams J. Kubida; Hogan & Hartson LLP

(57) ABSTRACT

A system and method for monitoring the configuration and/or status of target devices on a network. The system comprises a monitoring application that can be run on a first network device. The monitoring application is configured to monitor one or more target devices on the network using data collector modules that run on the target devices. The data collector modules are launched on the target devices by the monitoring application and are configured to collect configuration and/or status information about the target devices. After collecting the data, the data collector modules preferably pass the data back to the first network device, where a data upload application receives the data and uploads it to a central site. The data at the central site is placed in a database for access by users or clients. Users can access the data in the database by communicating with the central site, for example, via a dial-up connection or via the Internet. Once connected to the central site, a user can retrieve system information using a graphical user interface, or can submit report requests to the central site. The interface used to access information at the central site may be a web browser communicating through a web server at the central site.

18 Claims, 13 Drawing Sheets

U.S. PATENT DOCUMENTS 6,578,077 B1 * 6/2003 Rakoshitz et al. .......... 709/224
6,615,261 B1 * 9/2003 Sm.o slashed.rgrav ...... 709/224
6,654,803 B1 * 11/2003 Rochford et al. ........... 709/224
6,681,243 B1 * 1/2004 Putzolu et al. .............. 709/202

* cited by examiner

| | | Java Scout | | | □□ |
|---|---|---|---|---|---|
| File | | | | | |

Machine List Tree
- Machine List
  - cheerio (1)
  - procyon (1)
  - stargate (1)
  - explorer (1)
  - hp6mp (1)
  - mobile (1)
  - rocket (1)
  - solar (1)
  - soltest (1)

Current Machine: Cheerio, 1999-11-24 18:25:26

── Detailed Reports ──
dress resolution display and control

System Information Tree
- Unsolved Packages
- System Configuration
  - Network (Configurati
    - Domain Name (trekl
    - ifconfig (network
    - Default router (12
    - NIS status (NIS+ S
    - nsswitch.conf (nam
    - hosts (host name t
    - inetd.conf (Intern
    - resolv.conf (Name
    - services (Internet
    - arp (address resol
    - rpc (rpc program n
  - File System (Configu
  - locale (locale speci
- Kernel Configuration
  - Kernel Information(
  - System Definition (d
  - system (System speci
  - Modules (loaded kern
  - name to major (major
  - Devices (device inst
  - System Status

| Media IP | Table Address | Mask | Flags | Phys Addr |
|---|---|---|---|---|
| hp6mp | | 255.255.255.255 | | 00:60:b0:e7:8 |
| quest | | 255.255.255.255 | | 00:50:04:ad:d |
| explorer | | 255.255.255.255 | | 00:60:67:2d:1 |
| solar | | 255.255.255.255 | | 00:60:67:43:d |
| tomcat | | 255.255.255.255 | | 00:50:04:ad:d |
| jedi | | 255.255.255.255 | | 00:60:67:44:4 |
| rocket | | 255.255.255.255 | | 00:50:04:ad:d |
| banana | | 255.255.255.255 | | 00:60:67:43:d |
| arena | | 255.255.255.255 | | 00:50:04:ad:d |
| stargate | | 255.255.255.255 | | 08:00:20:a2:5 |
| moon | | 255.255.255.255 | | 00:50:04:ad:d |
| mirage | | 255.255.255.255 | | 00:50:04:ad:d |
| soltest | | 255.255.255.255 | | 08:00:20:72:3 |
| procyon | | 255.255.255.255 | | 08:00:20:75:4 |
| cheerio | | 255.255.255.255 SP | | 08:00:20:9a:0 |
| BASE-ADDRESS.MCAST.NET 240.0.9.9 | | | SM | 01:00:5e:00 |

── Status & Recommended Actions ──

Address resolution display and control

SYSTEM AND METHOD FOR MONITORING AND MANAGING SYSTEM ASSETS AND ASSET CONFIGURATIONS

BACKGROUND OF THE INVENTION

The present invention relates generally to systems and methods for monitoring the configuration and status of devices on a network, and more particularly to a novel monitoring system in which companies can determine the status of its network devices using the Internet or other suitable communication means.

As companies become more dependent upon network computing systems, it becomes more important to be able to monitor the status of those computing systems, so they can minimize downtime. In addition, as the network computing systems become larger for most companies, it becomes more difficult for the companies to keep track of their computing assets. In particular, as companies grow, they typically need to add new computing devices for new employees. Because technology is advancing so rapidly, the new devices added to the network system may be upgrade systems from the other devices that are on the network. For example, newly added workstations may have faster processors, more memory, an upgraded operating system, upgraded software applications, or the like. Thus, over time, network computing systems become a conglomeration of devices having different configurations.

In addition, as new releases of operating systems and software become available, it may be desirable to upgrade to those new releases. Unfortunately however, the new releases typically are more robust than the previous versions, and thus require more memory, faster processors, different hardware configurations, etc. Because most companies network systems comprise a conglomeration of devices having different configurations, it is very difficult to determine which machines need upgrades prior to installation of new operating system and software releases.

Thus, what is needed is a system and method to track the status of devices on a network to determine if the devices are working properly, and a system and method to track the configuration of devices on the network, so IS personnel can determine the configurations of the assets of the company.

SUMMARY OF THE INVENTION

In accordance with one embodiment of the present invention, a system and method is provided for monitoring the configuration and/or status of target devices on a network. The system comprises a monitoring application that can be run on a first network device. The monitoring application is configured to monitor one or more target devices on the network using data collector modules run on the target devices. The data collector modules are launched on the target devices by the monitoring application and are configured to collect configuration and/or status information about the target devices. After collecting the data, the data collector modules preferably pass the data back to the first network device, where a data upload application receives the data and uploads it to a central site. The data at the central site is placed in a database for access by users or clients. Users can access the data in the database by communicating with the central site, for example, via a dial-up connection or via the Internet. Once connected to the central site, a user can retrieve system information using a graphical user interface, or can submit report requests to the central site. The interface used to access information at the central site may be a web browser communicating through a web server at the central site.

In accordance with one embodiment of the present invention, the monitoring application may start a remote analysis program on the target devices, which is responsible for monitoring and managing the execution of the data collector modules on the target devices. The remote analysis program may be configured to communicate the collected configuration and/or status data back to the monitoring application.

In accordance with another embodiment of the present invention, the upload application may be configured to parse the data obtained by the data collector modules into packets, and then transmit the packets to the central site. In accordance with this aspect of the invention, the central site comprises an application that receives the data packets and reformats them into a full data file. The full data file then is converted into the database.

A more complete understanding of the present invention may be derived by referring to the detailed description of preferred embodiments and claims when considered in connection with the figures, wherein like reference numbers refer to similar items throughout the figures.

BRIEF DESCRIPTION OF THE DRAWINGS

Figure 10:
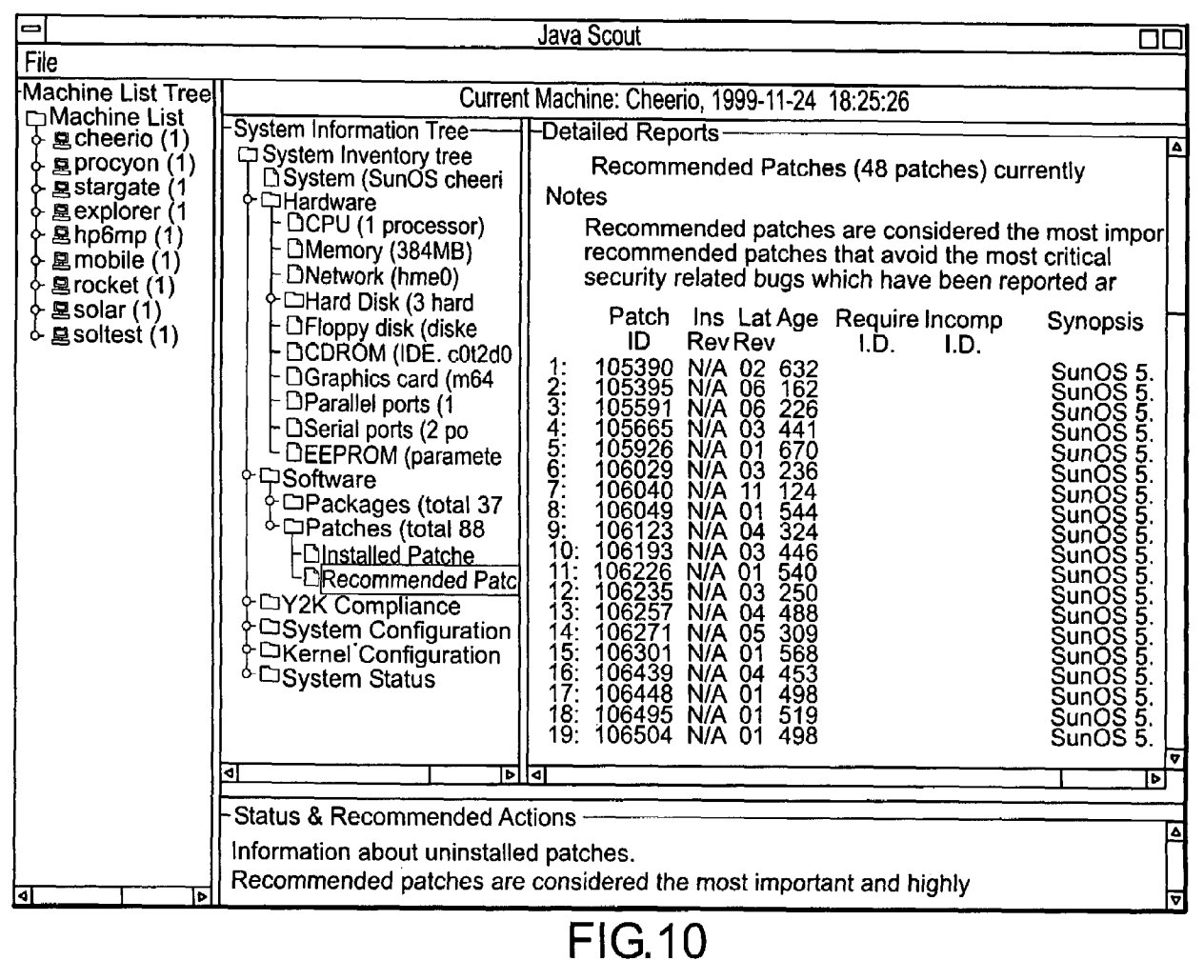

FIGS. 9–13 are diagrams illustrating sample screen shots that may be generated by one embodiment of the system of the present invention.

DESCRIPTION OF THE SPECIFIC EMBODIMENTS

A. Introduction

The present invention relates generally to systems and methods for monitoring the configuration and status of devices on a network, and more particularly to a novel monitoring system in which companies can determine the status of its network devices using the Internet or other communication means.

The present invention, is used to examine configurations of both software and hardware, as well as the system health of all or many of the systems and devices in a network. The system of the present invention probes some or all of the devices connected to the network and generates a system inventory report of each device, describing their configurations, which may include operating system information, disk information, graphic card information, network information, software application information, or the like.

In accordance with one embodiment of the present invention, the system is designed to run in a network environment, and may be installed and executed on one machine (referred to herein as the "master" machine). It then can collect the system information of all devices connected to the network (referred to herein as the "clients") by running data collector applications on the target machines. Details about the company and how device data is to be collected may be set forth in configuration-type files. For example, in accordance with one particular embodiment presented herein, two configuration files are used, namely a master configuration file (named "config" in Section C below) and a test configuration file (named "tests.config" in Section C below). After collecting data pertinent to the particular company machines or devices, the data may be forwarded to a central site for processing, manipulation and storage. A client/user then can access the data at the central site by using a suitable communication means, such as a dial-up connection, the Internet, or the like.

B. System Configuration and Operation

In accordance with one embodiment of the present invention, the data collection system and process typically comprises two steps:

1. Collecting the system information of some or all of the machines and/or devices connected to the network by running a data collection program. The data collection program will check some or all devices connected to the network and get their information.

2. After collecting the information for the specified machines and/or devices using the data collection programs as explained above, the information is sent to a central site and populated into a database. A user can access the data at the central site by directly dialing into the central site, or by logging onto the central site's web server using any suitable web browser. By selecting the appropriate option, a client user can view the system configurations for any specific machine to which the client user has access. The user also has the option to print reports about the machines being viewed.

Figure 1:
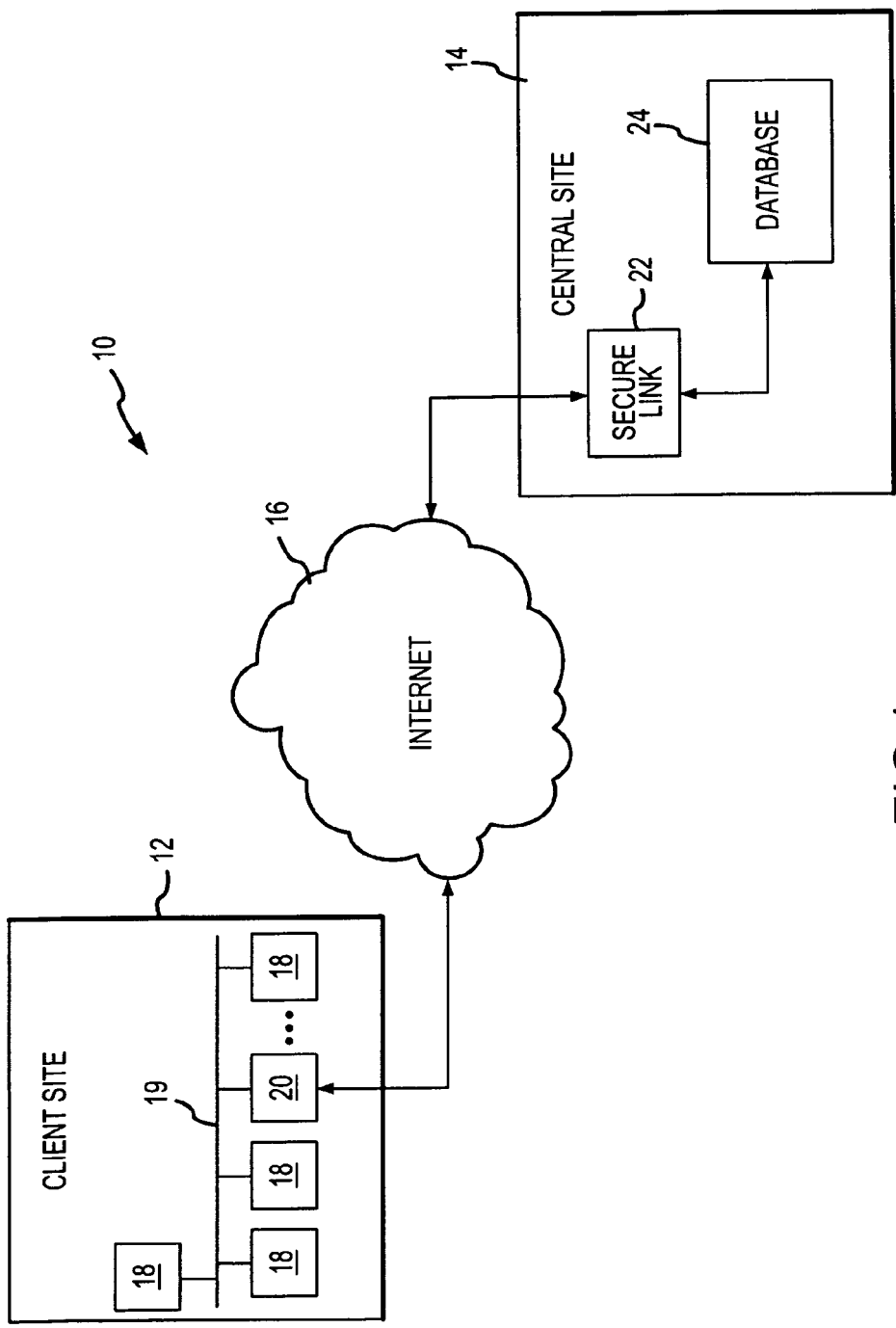
FIG. 1 is a block diagram illustrating one embodiment of a data collection system of the present invention.

Referring now to FIG. 1, an overview of a data collection system 10 will be described. In accordance with one embodiment of the present invention, data collection system 10 comprises a client site 12 in communication with a central site 14, via for example, the Internet 16. As mentioned briefly above, client site 12 comprises a plurality of machines/devices 18 that are to be monitored by data collection system 10. In accordance with one embodiment of the present invention, a data collection program or tool set may reside on a master machine 20, which in turn will run individual data collector programs (also referred to herein as "data collectors") on target machines/devices 18. As one skilled in the art will appreciate, target devices 18 and master machine 20 all may be connected together via a network connection 19.

The individual data collectors retrieve configuration information about machines 18 and forward that information to master machine 20, via network connection 19. In turn, master machine 20 uploads the configuration information to central site 14, via a communication connection, such as Internet 16. Central site 14 is configured so that the communication connection with client site 12 is secure, such as, for example, through a secure web server 22. When central site 14 receives the data from client site 12, one or more applications at central site 14 then will populate a database 24 with the data. The database then can be accessed by users at the central site, or by other authorized individuals via the Internet or other suitable communication connection.

Figure 2:
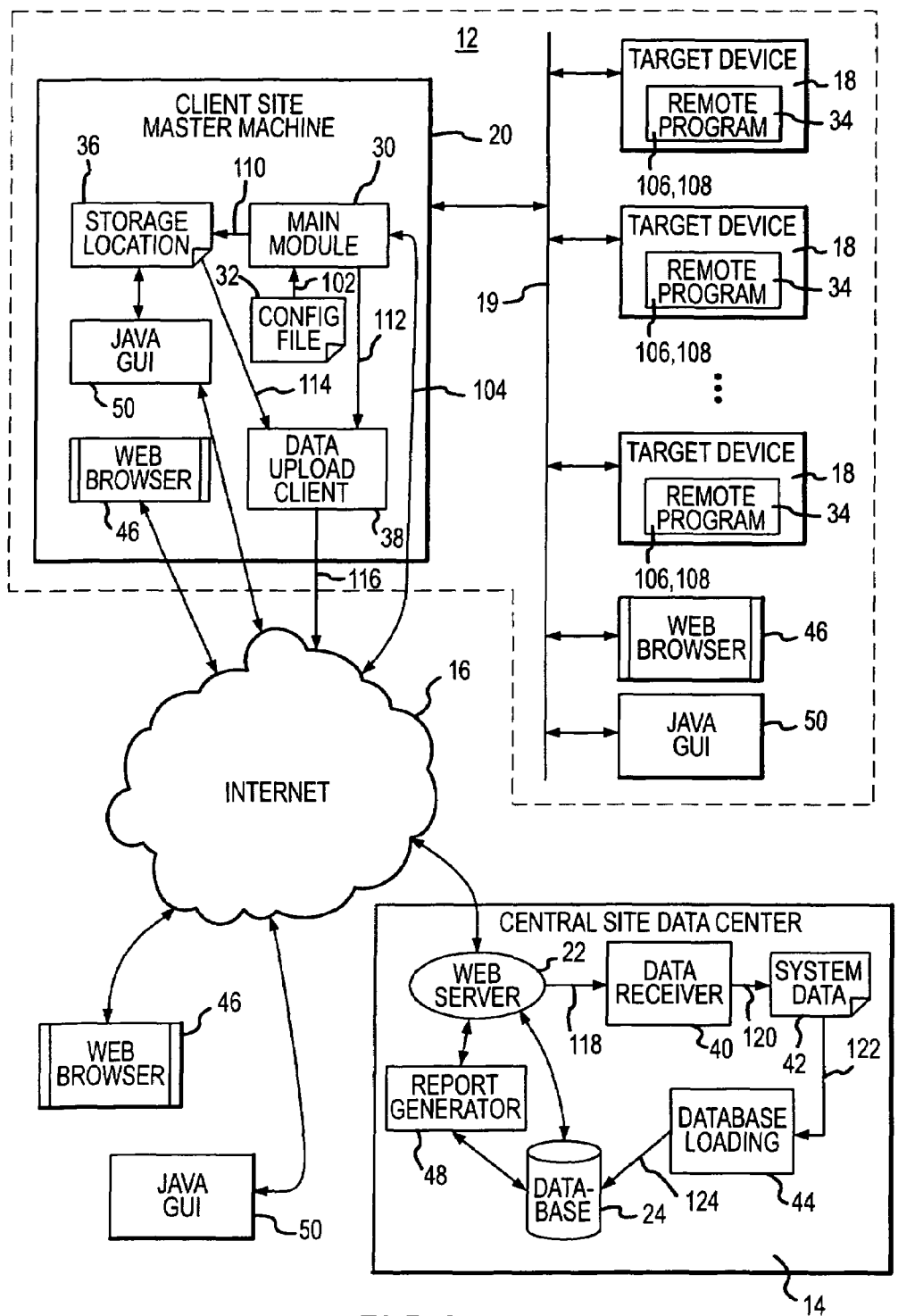
FIG. 2 is a more detailed diagram of the data collection system of FIG. 1.

Referring now to FIG. 2, a more detailed discussion of the data collection programs and processes will be described. As mentioned briefly above, the data collection tool set preferably resides at a client site and is started on a master machine 20. In accordance with one embodiment of the present invention, the data collection tool set comprises a main module 30, which is started on master machine 20. When main module 30 starts, it retrieves a configuration file 32 (step 102), which may reside at any location at client site 12 or at central site 14. In the illustrated embodiment, configuration file 32 is resident on master machine 20 at client site 12. Using the configuration file, main module 30 communicates with central site 14, via for example, web server 22, in order to determine if the most recent version of the data collection program/tool set is located at the client site (step 104). If there is a more updated version of the tool set available, the updated tool set will be downloaded to the client site. If not, main module 30 will continue.

Next, main module 30 uses configuration file 32 to identify the systems and devices on the network that are to be analyzed. As discussed in more detail below, the configuration file can be defined so that some or all devices on the network are analyzed. To start the data collection process, main module 30 establishes a remote data collection environment on each target device 18, and starts a remote analysis program 34 in those environments (step 106). In accordance with the embodiment illustrated in FIG. 2, main module 30 communicates with target devices 18 via a network connection 19. As discussed in more detail below, the remote analysis program 34 running on each target device 18 coordinates and monitors the execution of the plurality of data collectors. The data collectors retrieve configuration data from the target machines, and remote analysis program 34 then returns that data to main module 30 (step 108).

Upon successful completion of the analysis and data collection procedure, the configuration data for each device is stored it in a pre-defined storage location 36 (step 110). In accordance with one embodiment of the present invention, main module 30 obtains the data from the target devices and performs the store operation.

Next, main module 30 initiates a data upload client 38 (step 112), which when created, connects to web server 22 at central site 14, via, for example, Internet 16. After a suitable connection has been established, data upload client 38 retrieves data from storage location 36 (step 114), and transmits the data to web server 22 via the established connection (step 116). In accordance with one embodiment of the present invention, data is sent in the form of consecutive small files.

At central site 14, a data receiver program 40 collects the small files (step 118) and "re-constructs" them into the original data file format 42 (step 120). A database loading module 44 then obtains data files 42 (step 122) and loads them into database 24. As one skilled in the art will appreciate, database loading module 44 is configured to convert the data from data file format 42 into the appropriate database format. For example, any OLTP or OLAP database may be used. In accordance with one embodiment of the present invention, an Oracle™ database is used. In accordance with another embodiment of the present invention, database loading module 44 may comprise an open database connectivity (ODBC) mechanism.

After the data is populated into a suitable database or other data access mechanism, users at the central site or other authorized users, for example, clients, can access the data via a suitable communication connection with database 24. In accordance with one embodiment of the present invention, users can access the data using a web browser 46 via the Internet 16, or other suitable communication connection. As one skilled in the art will appreciate web browser 46 may reside at any location so long as it has an ability to communicate with the Internet. For example, as illustrated in FIG. 2, web browser 46 may reside on a device connected to network 19, it may reside on master machine 20, or it may be a web browser connected directly to the Internet from a location remote from the client site.

At the central site, a report generator module 48 may be used to extract data from database 24, for example via a database connectivity application program interface (API). Based on an end user's request, report generator module 48 extracts data from database 24 and formats the requested reports. The reports then are sent to web browser 46 for viewing and printing by the end user. Example reports are shown in FIGS. 3–8.

In addition to using a web browser to access the data, users can start a GUI Java interface tool 50 to examine the system information. Interface tool 50 can be configured to access system data 36 stored at the client site, or interface tool 50 can access data stored in database 24, for example via web server 22. Interface tool 50 can provide information about the system, as well as diagnostic results. Examples of screen shots that may be generated by interface tool 50 are shown in FIGS. 9–13.

The following sections set forth additional details about the different modules of the data collection system.

1. Automatic Upgrade Component

When main module 30 starts-up at the client site, it accesses configuration files (e.g., configuration files 32) and retrieves configuration parameters therefrom. See Section C (CONFIGURATION FILES) below for an example of configuration files that may be used. There are three configuration parameters that apply to the upgrade component. They are:

auto upgrade—specified as either "yes" or "no";

version file—a URL that specifies the location of the version file at the central site; and package location—a URL that specifies the location of the data collection software package at the client site.

If "auto upgrade" is yes, main module 30 retrieves the version file from the central site and compares the installed version with the latest version. If they do not match, the latest version is downloaded and installed. This function can occur automatically, or upon user request.

2. Data Collectors

Data collectors are application programs (e.g., Java applications, or the like) that run on the target devices on the network to collect data about those devices. The data collectors can be configured to obtain one specific piece of data about a device, or multiple pieces of data. For example, a data collector may be configured to obtain information about the status of an application residing on a device or about the status of various hardware components of the device. In accordance with one embodiment of the present invention, the data collectors are stored at the client site; however, new data collectors can be downloaded to or loaded onto the client site at any time.

As discussed briefly above, data collectors are configured to run on target devices 18 to obtain information and data about those devices. Once the information is extracted, the data collectors transmit the information back to master machine 20 at the client site, which then stores the data in storage location 36. After the data collectors have acquired the appropriate data from the target devices, the data collectors will clean-up any allocated resources at the device location and then shut down. Clean-up may include, releasing shared memory and locked files, deleting temporary files, etc. As discussed in more detail below, the remote program of the analysis tool set running on each target device preferably will control the execution, shut-down, and clean-up operations of the data collectors.

Below is a list of data collectors that may be used with the present invention. One skilled in the art will appreciate that the following list is merely an example of some data collectors, and that any suitable data collector application may be used with the present invention.

Memory Configuration:

This is a program that identifies the types and sizes of memory modules installed on a device.

Application Program Analysis:

This is a series of programs to determine if certain third party applications are installed on a device.

Kernel Information:

This is a program to retrieve a list of kernel parameters from the device.

An example of the output produced by this data collector is:

| | |
|---|---|
| Max no. of processes for system | 5930 |
| Max no. of processes per user | 5925 |
| Max no. of users (for system tables) | 370 |
| Max no. of BSD (/dev/ptyXX) pty's | 48 |
| Max no. of System V (/dev/pts/*) pty's | 48 |
| Size of virtual address cache | 16384 |
| Size of callout table | 283 |
| Size of inode table | 25520 |
| Size of dir. name lookup cache | 25520 |
| Size of quotas table | 0 |
| STREAMS: Max no. of pushes allowed | 9 |
| STREAMS: Max message size | 0 |
| STREAMS: Max size of ctl part of message | 0 |
| Max mem allowed in buffer cache | 0 |
| Max global priority in sys class | 6488124 |
| Max shm segment size in bytes | 0 |
| No. of shm identifiers to pre-allocate | 100 |
| Max no. of shm segments per process | 6 |
| No. of entries in semaphore map | 10 |
| No. of semaphore identifiers | 10 |
| No. of semaphore in system | 60 |
| No. of semaphore undo struct in system | 30 |
| Max number of operations per semop call | 10 |
| Max no. of semaphore undo per process | 10 |
| Max no. for semaphore adjust on exit | 16384 |
| scsi options | 8184 |

File List:

This program obtains a list of all local files. The information presented may be any information about the file, such as file name, file size, date and time created, date and time modified, file type, permissions, messages about the file, etc.

appcert

This particular application runs the command appcert against all the Sun Solaris Elf executables returned from file list except pkgs and exclude dir. It starts by comparing MD5 of the ELF files with the last MD5 of the same ELF file, if they are different, it runs appcert. It constructs a profile of interface dependencies for each object file within the product.

It checks for:

Private symbol usage in solaris libraries;

Static linking to archieves; and

Unbound Symbols.

Install Date:

This application retrieves the installation date, and OS update date from the system. It logs the beginning log date, the finish log date, as well as the upgrade log date.

Explorer Tests:
Disks
   provides disk format, swap, major/minor number, various output of df options and disk partition information.
SDS disk
   provides output of SUNWmd metastat, metadb and metaset commands
Sonoma
   provides status of save configuration files and ls sonoma devices (dsk/rdsk)
   conducts health check on all RAID modules
   lists all array devices connected to the system
   displays controller information, drive information, firmware information etc.
ssa
   checks the existence of ssa devices and pull the cNtNdN numbers.
Photon
   gets SOC+HA card fcode version
   lists all photons connected to the system
   gets information for each photon using logical path
   generates luxadm disp output
Veritas
   lists disk groups, disk volumes
   lists dg and dm definitions
Etc info
   saves a number of /etc files
Net info
   executes netstat, nfsstat, rpcinfo, and nissshowcache, all with various options
   checks firewall version
messages
   checks cp/var/adm/messages and dmesg
patch
   obtains modinfo and ls -l/var/sadm/patch output
package
   obtains pkginfo -l, -p and -i output
sysconfig
   obtains showrev, sysdef, prtconf, uptime, psrinfo, ifconfig eeprom, uname and prtdiag
   obtains sysconfig output
var
   obtains ls -ld/var/sadm, /var/sadm/softinfo/INST_RELEASE, and ls -l/var/yp/binding
starfire.ssp
   gets system service processor configuration
cluster
   gets information for HA and SunCluster 3. Data Collection Environment In accordance with one embodiment of the present invention, the data collection environment comprises a main module 30 that resides and executes on master machine 20, and a remote analysis environment and program 34 that executes on each target device 18. Main module 30 is the program that the user/client uses to launch the data gathering operation. Once started, main module 30 obtains configuration file 32 from its stored location and parses it. Using parameters from the configuration file, main module 30 verifies login information, such as "login," "user name," "user password," "upload user name," "upload user password," and the like. To verify these parameters, main module 30 logs-into target machines or devices 18 (e.g., through network connection 19), and also verifies the upload connection between the client site and the central site. In accordance with one embodiment of the present invention, the following login parameters may be used:
   login—specifies the method to login to remote systems. The remote systems are the systems (target machines) on which the data collectors will run. Examples of login values are telnet and rlogin.
   user name—this is the login name used.
   user password—this is the user password.
   upload user name—this is the login id for web upload.
   upload user password—this is the user password for web upload.

Main module 30 also performs other operations. For example, if the parameter "auto upgrade" is specified in the configuration file, main module 30 will invoke the automatic upgrade component, as described above. Also, if a URL is given for the location a test configuration file, the main module 30 will download the test configuration file from the specified URL. Main module 30 also uses network information specified in the configuration file to get a complete list of host names or IP addresses of target machines 18. Main module 30 then will probe each machine on the list and eliminate duplicate entries. The main module can probe multiple machines at one time. The number of machines that can be probed at one time can be specified in the configuration file.

Main module 30 then parses the tests configuration file (test.config file) that it obtains. A sample test.config file is provided in Section C (CONFIGURATION FILES) below. After parsing the file, the main module preferably use the information specified in the test configuration file to enable/disable data collectors. Next, main module 30 launches remote analysis program 34 on each of the target devices to be probed. Multiple remote programs can be launched concurrently. The number of multiple launches can be controlled by a "thread count" parameter in the configuration file.

Remote analysis program 34 is executed on each target machine and is given configuration parameters, such as "time out", "run test", and "upload test," by main module 30. Following is a definition of these parameters:
   "time out"—wait period before aborting a collector.
   "run test"—a list of collectors to run. If not specified, all collectors will run.
   "upload test"—list of collector data to be uploaded. If not specified, upload all data.

After receiving the parameters, remote analysis program 34 then runs the specified data collectors on the target machines/devices. If data collectors are not specifically defined, all the data collectors are run. As the data collectors are running, the remote analysis program monitors the collectors to make sure they are running properly. If a process runs longer than the specified number of seconds, the remote analysis program may abort it. The time-out value can be set in the configuration file.

After the system information is obtained by the data collectors, remote analysis program 34 (or the data collectors themselves) transmits the data to main module 30, which then places either a reduced data file or a copy of the full data file in storage location 36. In accordance with one embodiment of the present invention, storage location 36 may comprise a data upload read/write queue or other suitable storage location.

4. Data Upload

In accordance with on embodiment of the present invention, the data upload component of the system preferably comprises of a number of programs, which can be divided into client programs 38 and a server program 40. Client programs 38 include for example, a data upload scheduler program, and a data upload program. The central site server program 40 preferably comprises a data receiver program. Each of these programs will be described in more detail below.

4.1 Data Upload Scheduler Program (Client)

The upload scheduler program resides at the client site (e.g., on master machine 20) and listens to storage location or read/write queue 36 to determine if the queue has data. When there is a data file available, the data upload scheduler program invokes the data upload program to send the data file to the central site destination. The central site destination may be specified by a parameter in the configuration file. The data upload scheduler can invoke multiple data upload programs at one time. The number of threads of the data upload program can be specified in the configuration file.

4.2 Data Upload Program (Client)

The data upload program is responsible for sending data files over to the central site destination. If both full data and reduced data are available, the reduced data will be sent to the central site destination, otherwise, the full data will be sent. Any data transport mechanism may be used to send the data files to the central site. For example, MAILTO, HTTPS, ftp, file, UUCP, or any other transport mechanism may be used. A description of some of these methods is as follow:

Mailto

When using mailto, the data upload program preferably splits the data file into multiple chunks or packets of bytes. The size of each chunk can be specified by a "chunk size" parameter in the configuration file. Checksums are calculated for each chunk and for the whole data file. The data upload program then will mail each chunk as a base64 encoded MIME attachment to the central site. The mail address at the central site can be specified in the configuration file. A file containing the number of chunks and the checksums will be sent with the first chunk as a base64 encoded MIME attachment. At the mail server at the central site, data receiver program 40 preferably is used to receive the fragmented data files from the data upload component and then reconstruct them into a complete data file 42. Data receiver program 40 then can invoke the database load program 44, as discussed below. When using the mailto transport mechanism, data receiver program 40 may comprise a standard email catcher application.

HTTPS

As one skilled in the art will appreciate, HTTPS is a secure data transport mechanism. When using this mechanism, the data upload program preferably splits the data file into multiple chunks or packets of bytes. As with the mailto system, the "chunk size" may be specified in the configuration file. Checksums are calculated for each chunk, as well as for the whole data file. All posts preferably use secure HTTPS/SSL with an HTTP login and password, possibly through an HTTP proxy. The first HTTP POST sends the data file checksum and the number of chunks to the web server. Then, each chunk is sent to the web server using HTTP POST. After each post, the data upload program verifies the return status. If the HTTP POST fails, it will retry that chunk. If the retry fails, it logs the entry and removes all data chunks from the local system. After all chunks are sent successfully, it will remove the chunks and the upload file (preserving the full data file) from the local system and exit. As with the MAILTO transport mechanism, data receiver program 40 at the central site will receive the data chunks and reformat them into a complete data file 42, as discussed in more detail below.

ftp

Using the ftp mechanism, the data upload program will "ftp" the data file over to the destination machine.

file

Using the file mechanism, the data upload program will "cp" the data file over to the destination directory.

UUCP

Using the UUCP mechanism, the data upload program will send the data file over to the destination via uucp(1C).

4.3 Data Receiver Program (Server)

At central site 14, data receiver program 40 preferably receives the data from the data upload program and merges the data packets if necessary. As one skilled in the art will appreciate, data receiver program 40 may operate differently for different transport mechanisms. For example, if HTTPS is used, data receiver program 40 may comprises a servlet program on web server 22, which is responsible for receiving the data files and merging them if necessary. If ftp, file, or UUCP transport mechanisms are used, data receiver program 40 may operate differently.

After receiving each file packet, data receiver program 40 verifies the checksum of the packet and sends a status back to the data upload program. When it receives a complete set of packets, the program then merges the packets into a data file and verifies the checksum for the complete data file. If a data file is complete and accurate, data receiver program 40 then stores the data file in a storage location 42, where it waits to be loaded into the database. Storage location 42 may comprise a read/write queue.

5. Data Reduction and Loading

In accordance with one embodiment of the present invention, data loading module 44 comprises two components; a database load scheduler program, and a database load coordinator program. The database load scheduler program listens to storage location or read/write queue 42 in which data is placed by data receiver module 40. When there is a data file available in the queue, the database load scheduler program calls the database load coordinator program to load this data set into database 24. The database load scheduler program can be configured to invoke multiple load coordinator programs at one time.

The database load coordinator program unpacks the data files and then calls a data load program to load data into the database. For each data collector specified in the data collection tool set at the client site, there is a corresponding data load program that is called by the database load coordinator program. The data load programs parse the data collected by the corresponding data collectors and then load the entries into staging tables for database loading. After all the data load programs have been run, the database load coordinator program informs the database that a data set has been loaded into the staging tables. Then, a database background process loads/converts the staging tables to the database tables. After the database is loaded, the database load coordinator closes the database connection and moves the data file from queue 42 to an archive.

6. Database

As mentioned above, the database used with the present invention may comprise any suitable OLTP or OLAP database. In accordance with one embodiment of the present invention, an Oracle™ database is used. Preferably, the database schema is designed to receive and organize data from various sources, including: customer account information; customer network information; system hardware data information; software packages data; software and operating system patches information; appcert data information; system analysis data; and any other suitable information.

As discussed briefly above, before data is actually input into the database, the data load programs convert the data from data files into staging tables, where the data is stored temporarily. The staging table type is chosen depending on the data entered. Once the staging tables are filled, a store procedure is called to populate the data into the master database tables. As mentioned above, the store procedure may be a process that runs in the background.

In accordance with one embodiment of the present invention, the store procedure preferably compares the data in the master table and the staging tables. If changes are found, the process stores the information that is in the database master table into an audit table, and then moves the new information from the staging table to the database master table. The audit table is used to archive older versions of data, so that machine histories can be kept. If there are no changes found, the process updates the timestamp and keeps the information in the database master table. Preferably, the database master table always has the most current data.

7. Report Generator

As discussed above, report generator 48 at central site 14 is used to extract data from database 24 and format reports. In accordance with one embodiment of the present invention, report generator 48 is configured to receive report requests from users via the Internet. In accordance with this aspect of the present invention, report generator 48 comprises a set of "servlets" that accept requests from the users. The servlets make SQL requests to database 24 and compose HTML reports. The reports may be organized into different categories and can be accessed by different user groups based on those categories. For example, one set of reports may be designed for viewing by client/user personnel, while another set of reports may be designed for use by personnel at the central site only. In any event, one skilled in the art will appreciate that once the data is input into a database, any number of reports or queries can be generated.

In accordance with one embodiment of the present invention, customer reports may be accessed by clients/users of the system. Preferably, access is restricted so clients only can obtain access to their own system environment. In accordance with this aspect of the present invention, a user only can view the system information belonging to his/her company. Also, clients may have different user accesses within its organization. For example, an organization may define a "regular" user that can login to the main interface and view all the system information for that organization. In addition, the organization may define an "administrator" that has the option to edit the user information, such as adding or deleting a user, as well as viewing the system information. In any event, one skilled in the art will appreciate that various different security accesses to the data may be granted.

In addition to client reports, reports may be generated for personnel at the central site. For example, central site sales and/or management people may have access to customer/client information as needed. Again, any suitable report may be generated.

Figure 3:
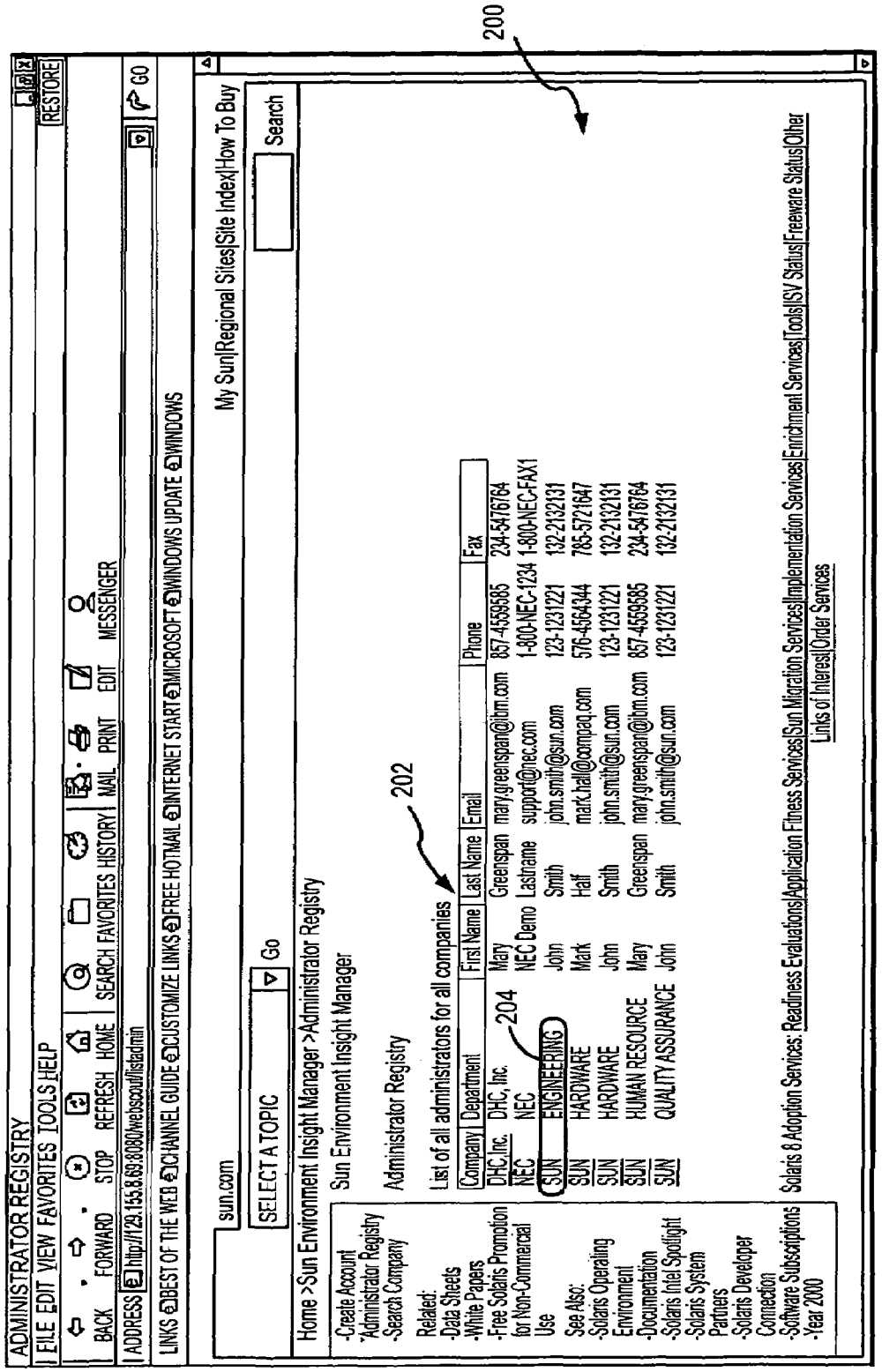
FIGS. 3–8 are diagrams illustrating sample reports that may be generated by one embodiment of the system of the present invention, and that may be displayed on a web browser and printed therefrom.

Referring now to FIGS. 3–8, examples of some reports that may be generated by the present invention will now be described. In particular, FIG. 3 illustrates a sample report 200 showing information 202 about companies that may be the using device configuration collection services provided by central site 14. This particular report may be used by personnel at the central site to keep track of customers/clients. For purposes of explaining other sample reports, the client "Sun Engineering" 204 will be used.

Figure 4:
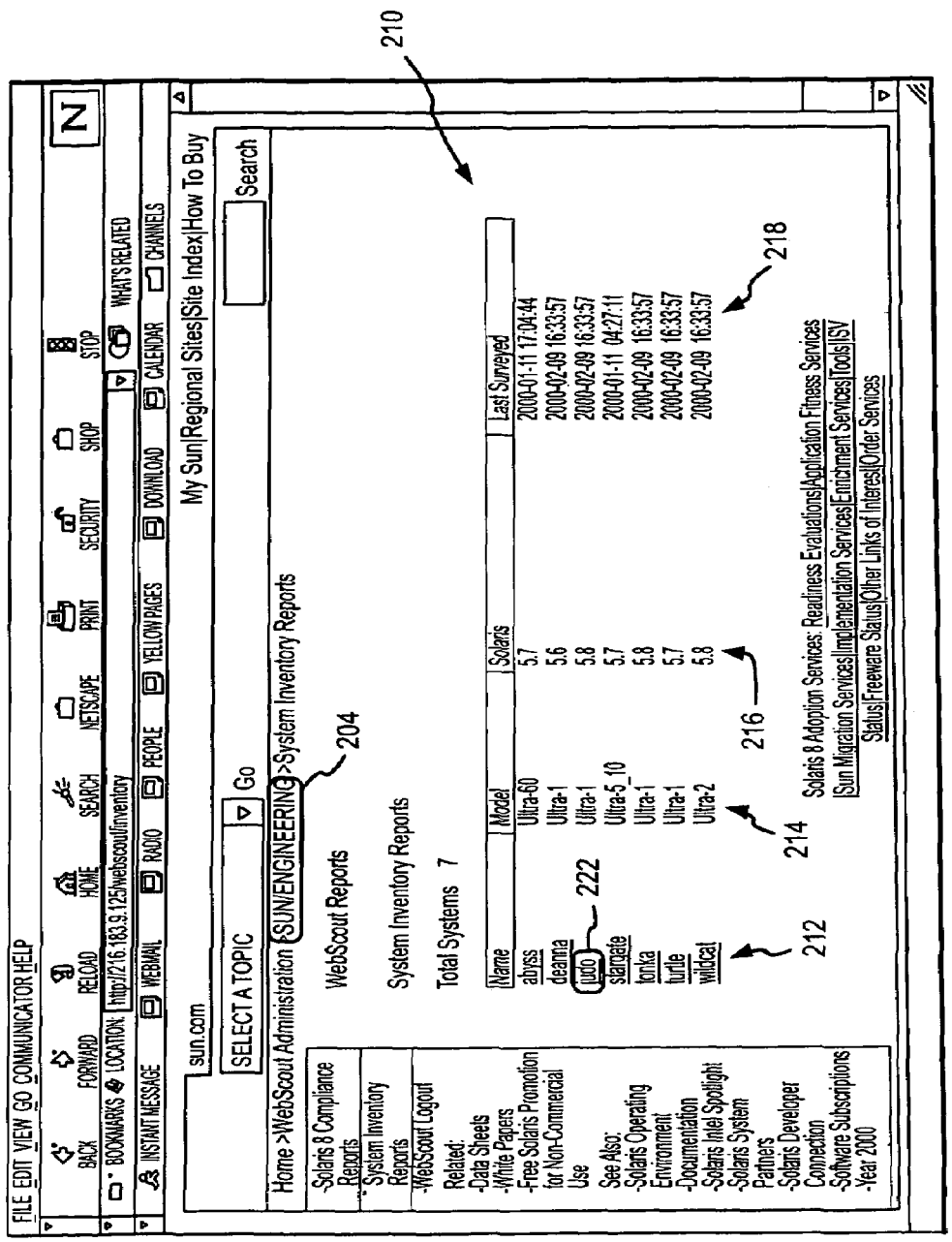

FIG. 4 illustrates a report 210 showing an inventory of all systems 212 for Sun Engineering client 204. In this particular example, the report shows the system name 212, the system model 214, the operating system version 216, and the date that the system was last surveyed by the data collection system of the present invention 218. However, as one skilled in the art will appreciate, the report can be configured to show any information about a computing device. Also, in the example reports presented herein, all the system are Sun Microsystems' devices running Sun's Solaris operating system. However, one skilled in the art will appreciate that the present invention is not limited to obtaining configuration data from Sun systems only. The present invention can be used to obtain configuration information from any computing device on a network, including, but not limited to, devices running Microsoft's Windows and Windows CE operating systems, Apple's Macintosh systems, printers, storage systems, routers and hubs, scanners, or any other suitable device.

Figure 5:
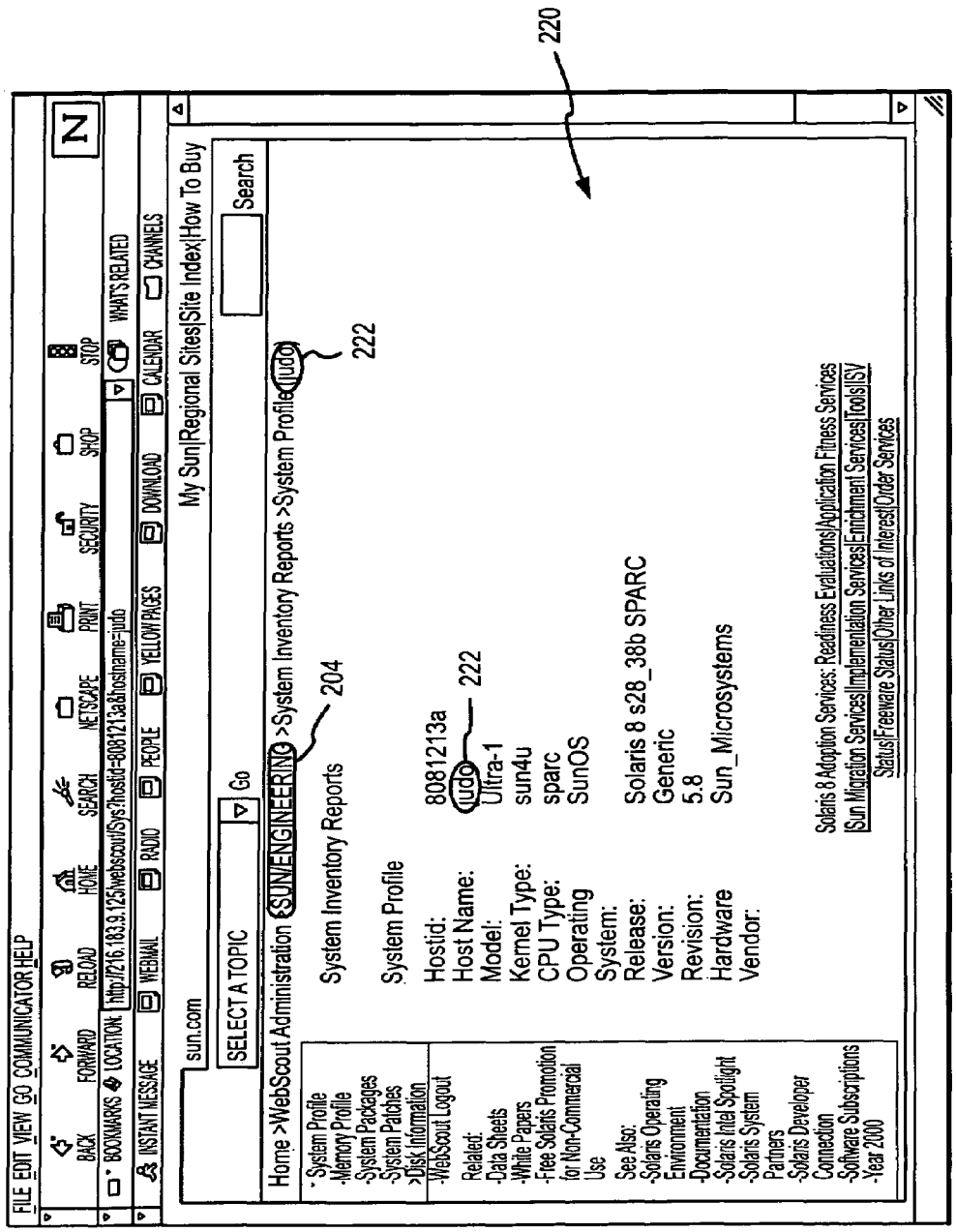

FIG. 5 is a sample report, which illustrates the profile of a particular system. In the illustrated embodiment, the system Judo 222 is chosen from list of systems in report 210. The system profile information may comprise any information about the system. In accordance with the illustrated embodiment, the profile information includes host ID, host name, model type, kernel type, CPU type, operating system type, release, version and revision information, and the hardware vendor.

Figure 6:
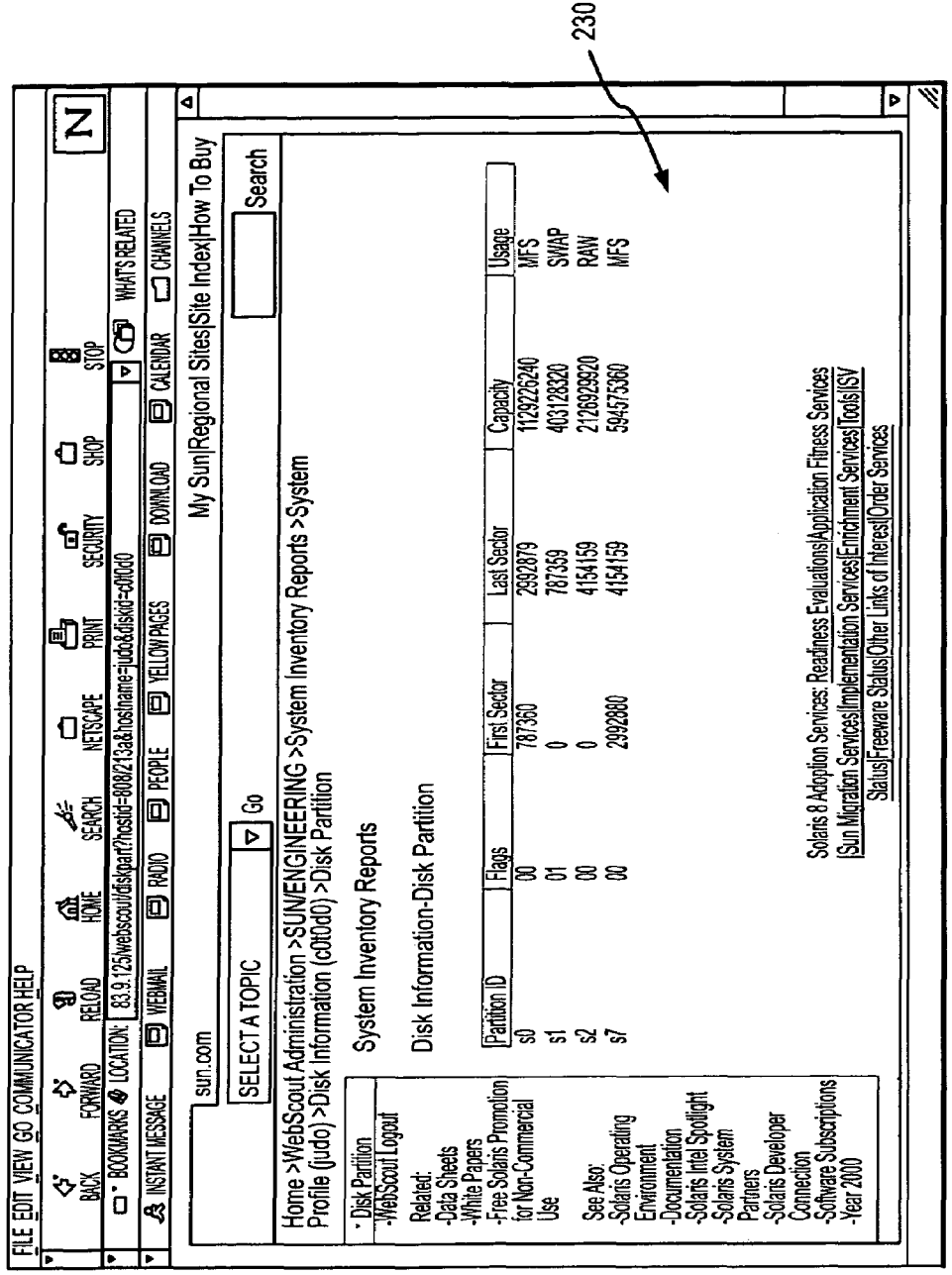
Figure 7:
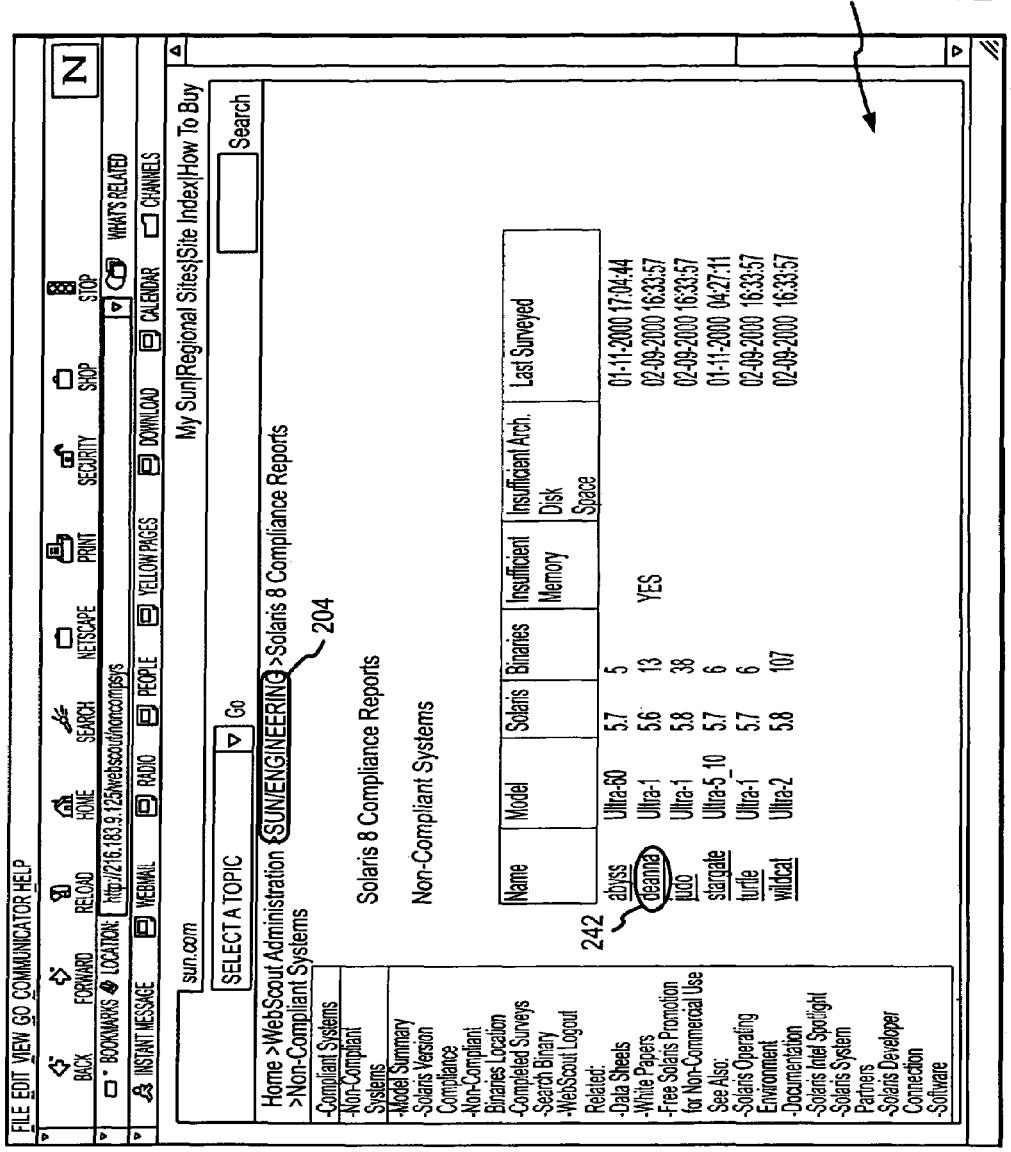

Other information about the system also can be viewed. For example, FIG. 6 illustrates a disk information report 230, which may include information about a system's disk configuration. In the illustrated embodiment, the disk information presented may include partition ID, flags, first sector address, last sector address, capacity, usage type, etc.

Figure 8:
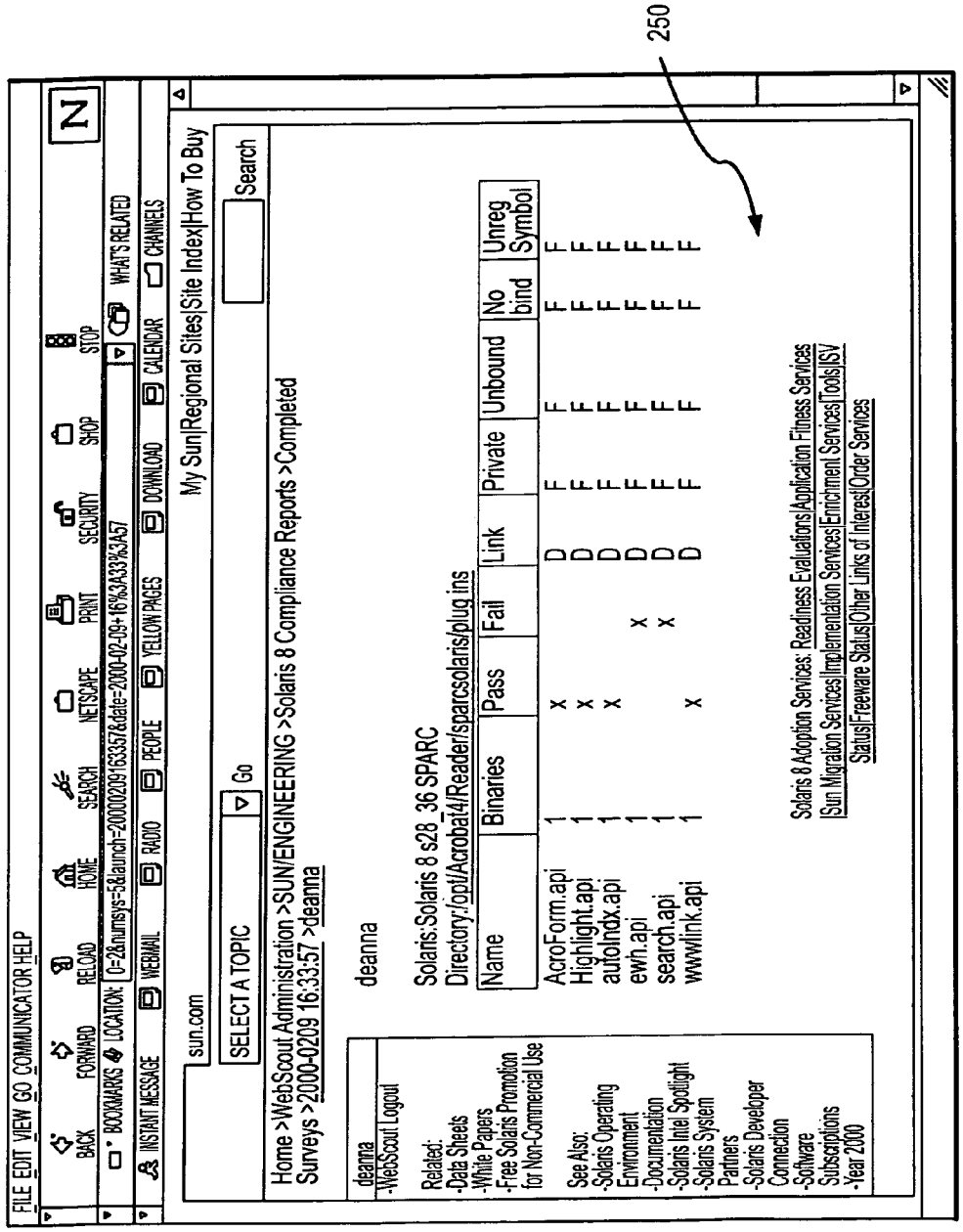
Figure 9:
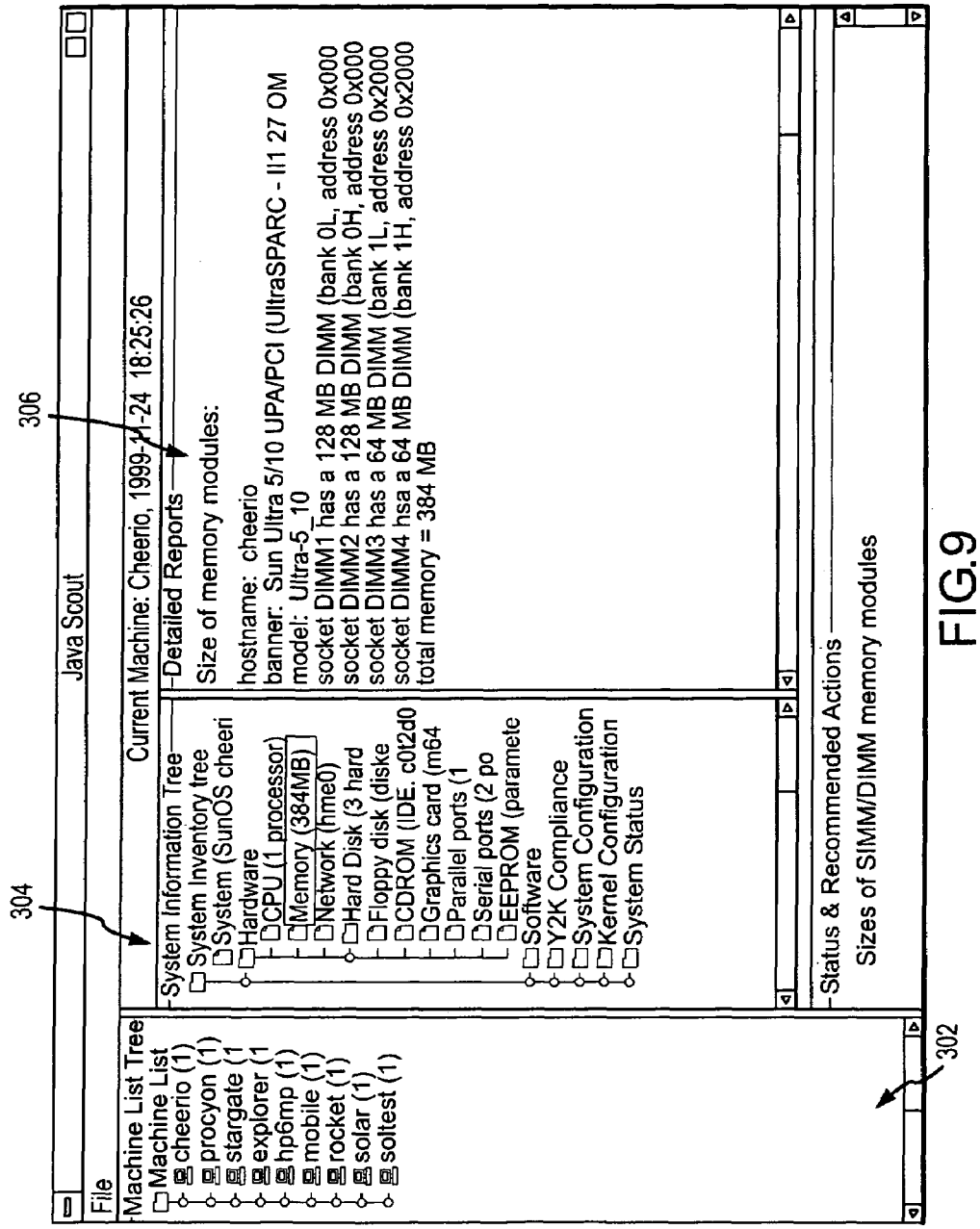
Figure 12:
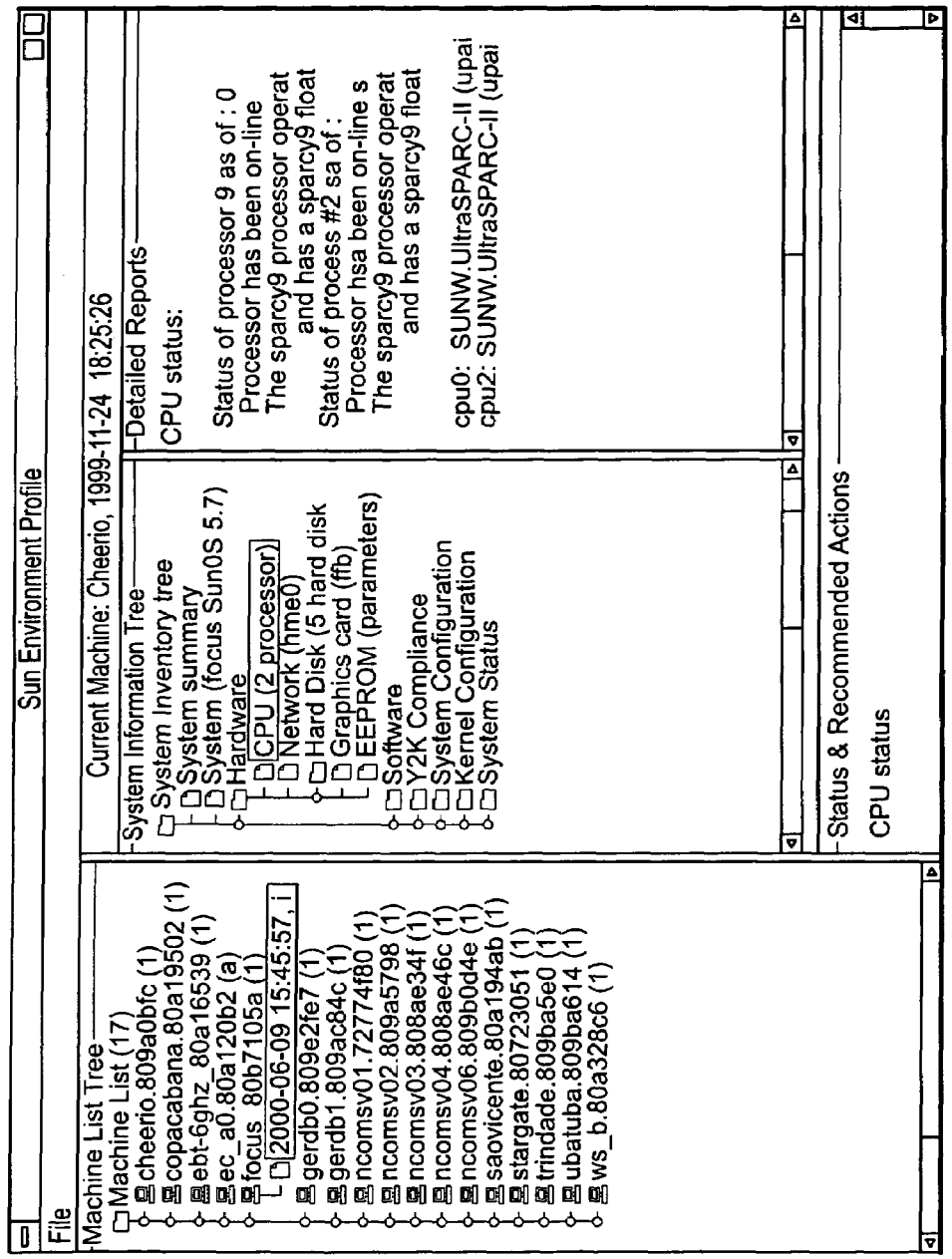
Figure 13:
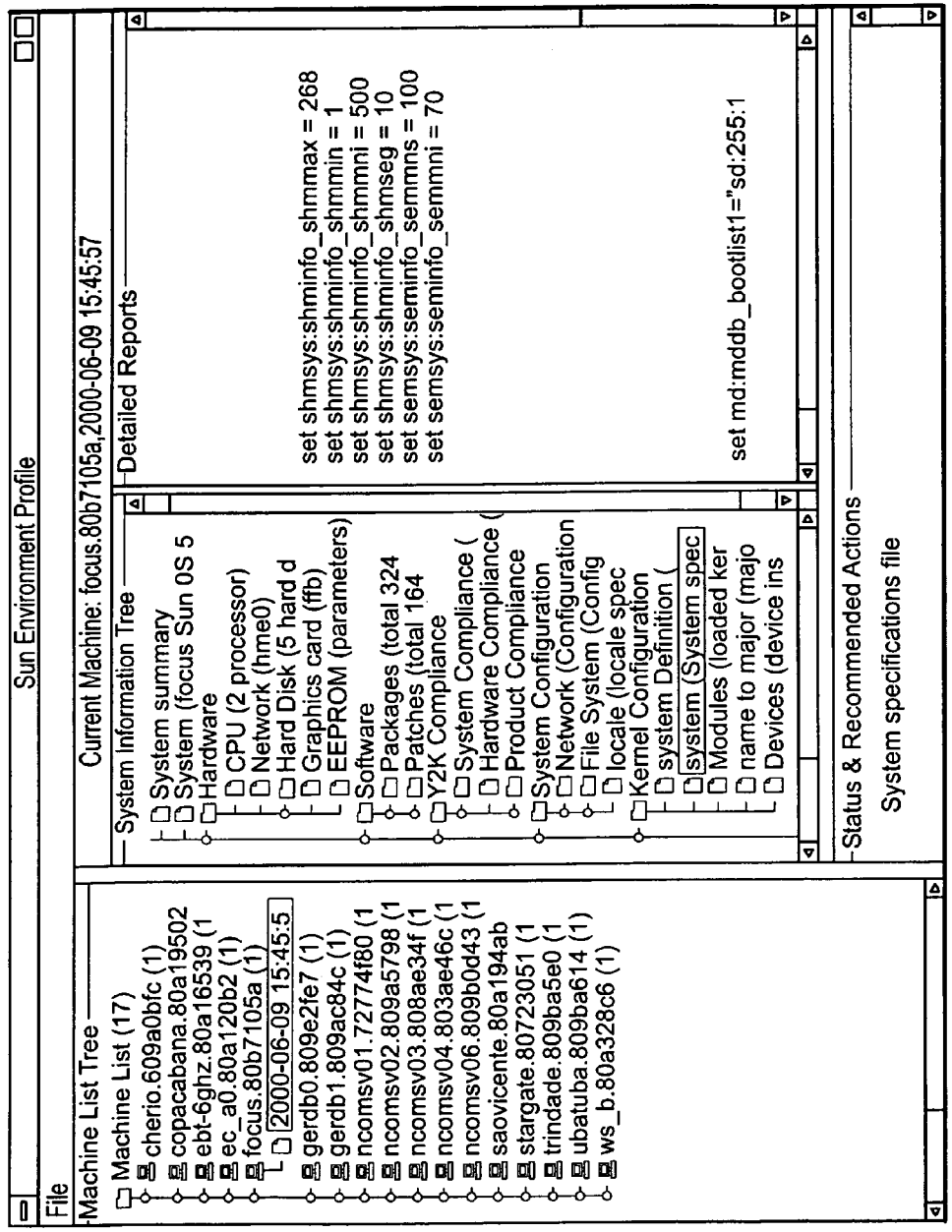

Finally, as illustrated in FIGS. 8 and 9, reports can be generated to show whether systems are configured properly to receive certain operating system or software updates, or whether a system's applications meet certain compliance requirements. For example, FIG. 8 illustrates a report 240, which shows whether the systems at client Sun Engineering 204 are configured properly to receive the Sun Solaris 8 operating system upgrade. As illustrated in FIG. 8, the report will indicate whether the system's memory or disk space is insufficient. Other insufficiencies also may be displayed. Similarly, FIG. 9 illustrates a report 250, which shows additional details about a system's insufficiencies.

While various reports are presented herein as examples, one skilled in the art will appreciate that once configuration data about systems and devices is place in a database, any report layout may be developed to present that data. Thus, the present invention is not limited to the illustrated embodiments set forth herein.

8. Web Server

As discussed above, web server 22 can be used as an interface by the data upload programs to communication data from the client site to the central site. In addition, web browsers may be used to access data in database 24 via web server 22. In accordance with this aspect of the invention, any number of web pages may be used as a front end to accessing the data. Programs at web server 22 preferably are used to process user requests and generate results back to the browser. Accordingly, HTML or JavaScript programs may be generated to facilitate various functions, such as user administration task and general client usage functions. User administration tasks may include, user login functionality, new user account creation, user deactivation functions, etc. General client usage functions may include report generation, and data navigation.

In addition to front-end applications, web server 22 may include various servlets for accessing data in database 24. The servlets may include the ability to issue SQL statements to the database in order to retrieve data requested by a user. As one skilled in the art will appreciate, any number of data access programs may be developed as web server applications.

9. Java GUI Interface

In addition to accessing data using a web browser, a non-browser based Java application may be used. In accordance with this aspect of the present invention, a Java base GUI interface is used to access data either located at the client site (e.g., in a data file stored in storage location 36) or located in database 24 at the central site. FIGS. 9–13 are screen shots illustrating an example of what a Java GUI interface may look like. In accordance with the embodiment of the present invention illustrated in the FIGS. 9–13, the GUI interface may comprise various columns for displaying information. In the illustrated embodiment, a first column 302 displays a list of machines located on a client network, a second column 304 lists categories of information available for the specific machine chosen, and a third last column 306 lists detailed information according to chosen category. By clicking on any of the systems, the details of the configurations are listed. The Java GUI interface may be configured to display any of the information obtained during the data collection process.

C. Configuration Files

As discussed briefly above, configuration files may be used to direct the data collection tool set on how to collect data and from which machines or devices. The following is a description of two configuration files that may be used in accordance with one embodiment of the present invention.

User Configuration File (config)

config is a configuration file used to control how the information should be collected from the machines/devices. In accordance with one embodiment of the present invention, the configuration is divided into eight sections where each section contains a list of attributes in the form: name=value.

1. Company Information Section:

This section contains 7 attributes: 1) company name; 2) department name; 3) customer number; 4) service part number; 5) contract number; 6) country; and 7) site.

Example:
company name=Sun Microsystems Inc.
department name=Enterprise Service
customer number=555555
service part number=22222
contract number=11111
country=USA
site=companysite These attributes may be entered into the system during the registration procedure. Once configured, a user need not enter them again.

2. Login Information Section:

This section typically contains 3 attributes login: specifies the method to login to the remote system. Currently it can either be telnet or rlogin. The default is rlogin.

user name: specifies the user name used to login to the remote system. If this is not specified, the current user name is used.

user password: specifies the user password used to login to the remote system.

If login is rlogin and the user password is not specified, the main module 102 will set-up a file under the user's home directory and assume trusted hosts are allowed. If login is telnet and user password is not specified, the main module will prompt for a password. If the user name and the user password are not correct, the main module will return an error and exit.

Example:
login=rlogin
user name=sei
user password=seil

3. Hosts Information Section:

This section consists of the following attributes:

hosts name service: specifies the way to obtain a list of remote hosts names. In accordance with one embodiment of the present invention, the data collection tool set supports four name services: NIS, NISPLUS, DNS, and FILES. This attribute may contain more than one name service and they will all be used. (e.g. if NISPLUS and FILES are specified, machine names returned by NISPLUS and FILES are probed). The value of this attribute can be set to local. If the value local is chosen, the data gatherer will run on the local host only. Note that if local is chosen, it will override other name services. If this attribute is not specified, NISPLUS then NIS are assumed (if NISPLUS is not installed on the machine).

dns: lists the machines under a specific zone (ls -t A zoneName). The dns attribute may specify more than one zone separated by a colon (:). Each entry consists of two parts, the first part is the DNS name server and the second part is the DNS zone name separated by a comma (,). If the host name service section does not specify DNS, this attribute is ignored. If there is no DNS name server specified, the data collection program will use the default DNS name server configured in the launch machine.

files: this attribute is used to specify a list of files from which to get the client names. This attribute is ignored when FILES is not specified in the hosts name service attribute. The host file is a text file with each line specifying a host name or an IP address. Note that only the first name is taken for each line of the host file and the rest of the line is ignored. (#) is used to indicate a comment in the host file.

Example:
hosts name service=files
dns=dns_server, east.sun.com:central.sun.com
files=/etc/hosts:/tmp/hosts 4. Filter Information Section:

This section contains multiple lines of filter attributes. A filter attribute specifies filtering rules. The data collectors probe machines returned by hosts name services provided that the machines meet one of the filter rules. If no filtering rules are specified, all hosts returned by the hosts name service are probed.

The filter attribute may contain a list of host names, network names, or DNS suffixes. A name can be a host name, a network name, or a dotted address.

Machines and networks preferably are separated by a colon (:) and can be concatenated in a single filter list. A network name or dotted address should start with a: (@) and a DNS suffix should start with a dot (.).

Example:
networks
filter=@129.155:@129.144.0.0
filter= @9.123.132/20:@10.134.8.12,255.255.255.0
filter=@mynet/17
hosts
filter=192.9.49.30:204.146.80.99
filter=java.sun.com:scoter
dns suffix
filter=.opcom.sun.com:.east.sun.com In the above example, the first three filter attributes specify five networks:

- network address 129.155.0.0 with network mask 255.255.0.0 netmask is determined from the zero octets in the low-order sections of the address.
- network address 129.144.0.0 with network mask 255.255.0.0 netmask is determined from the zero octets in the low-order sections of the address.
- network address 9.123.128.0 with network mask 255.255.240.0 network mask length specified explicitly following a slash delimiter.
- network address 10.134.8.0 with network mask 255.255.255.0 network mask specified explicitly following a comma delimiter.
- network address mynet with network mask 255.255.128.0 network name specified instead of dotted address followed by a network mask length.

The network name is converted to a dotted address using getnetbyname(3N).

The hosts filter attributes specifies four hosts.

The dns filter attribute specifies two DNS suffixes.

5. Test Section:

This section contains 2 attributes:

thread count: which is the number of instances running the datagatherer concurrently. The default is 10.

output data dir: directory where the output of the data gathering procedure will be located. The default output data directory would be located in the installation directory (as per our example $/home/sei/output). Note that the login user (as specified by the user name attribute) should have write permission to this directory and this directory should be accessible from all client machines using the same path name.

Example:
thread count=10
output data dir=/home/sei/output

6. Web Proxy Login Information Section:

This section identifies the following:
web proxy: proxyhost
web proxy id: id of the proxy user
web proxy passwd: password of the proxy user Please note that the id and password are not mandatory fields. There are some proxy servers that require proper authentication for access. For these servers the attributes id and password should be specified.

Example:
web proxy=http://webcache.canada
web proxy id=sei
web proxy passwd=seil 7. Data Upload Information Section:

This section contains the upload id and password, as well as the upload URL for the user to choose the upload URL of the web server:

upload id: the id used for uploading data to the upload URL destination. It may be automatically filled after the registration procedure, so the user does not need to modify it.

upload password: the password pertinent to the upload id. It may be automatically filled after the registration procedure, so the user does not need to modify it.

upload URL: the upload URL of the web server. If this part is not specified, no upload will be done.

chunk size: the amount of data to upload in each transfer. The number may be appended with K (*1024) or with M (*1024K)

concurrent uploads: maximum number of concurrent upload connections. The default is 10.

Example:
upload id=esun
upload password=esun1
upload URL= https://ssrvce.sun.com/SEI-servlets/rcvFile
chunk size=512k
concurrent uploads=5

The methods used for data transportation are:

mailTo, the data is split into multiple chunks and each chunk is mailed to the corresponding address.

Example:
upload URL= mailTo:se_insight@central.sun.com
where se_insight@central.sun.com is an email address.

http/https, the data is split into multiple chunks and each chunk is sent using HTTP POST. An HTTP loginid and password are required for added security.

Example:
upload URL= https://service.sun.com/SEI/rcvFile
upload id=sei
upload password=seil
where https://service.sun.com/SEI/rcveFile is a the URL to upload the data to.

ftp, the data file is sent using ftp. A login id and password are required.

Example:
upload URL=ftp://machineName/directory
upload id=sei
upload password=seil
where the machineName is the name of the ftp machine and directory is the directory path relative to the home directory of the user.

File, the data file is moved using cp command.

Example:
upload URL=file:/home/sysadmin/data
where /home/sysadmin/data is the target directory name.

8. Data Collector Section:

This section consists of one argument test conf URL which specifies the place to get a new tests.config file. If it is not specified, the local tests.config file is used. If the tests.config file is not found, all test cases will be run and full data will be uploaded.

Example:
Test conf URL= http://sservice.sun.com/tests.conf

Test Configuration File (tests.config)

This file is used to choose what type of data collectors to run and what type of data should be uploaded. A data collector is a tool, which collects a specific set of information from client machines. An example of a data collector is explorer which run tests to gather disk information, network information etc.

This file contains the following attributes:

run test: specifies the data collectors to be run separated by a comma (,). The default data collectors are: explorer, kernelInfo, installdata, and sysconfig. If this attribute is left unspecified, all the data collectors will be run.

Example:

run test=explorer, kernelinfo, installdate where explorer, kernel Info, and installdate are data collectors.

upload test: specifies which data collectors' data to upload. The default is to upload all data.

Example:

upload test=explorer, kernelinfo where explorer and kernelInfo are data collectors.

[filelist]: marks the beginning of filelist specific attributes:

md5 max size: specifies the maximum size of the file that filelist should allow to calculate a checksum. If the file size is bigger than md5 max size, md5 will not be calculated for this file.

Example:

md5 max size=300000000

The above example instructs filelist not to calculate md5 checksum for file size bigger than 300M.

include dir: the directories that should be included in the filelist test. This attribute is accumulative. By specifying the value local, this instructs filelist to only go through the local ufs file systems. The names of the directories must be explicitly identified. Note that if include dir attribute is not specified, local is assumed and all local ufs file systems are included.

Example:

include dir=local,/export/home/sysadmin

The above example instructs filelist to include all ufs file system and the /export/home/sysadmin directory.

exclude dir: the directories that should not be included in the file slist test. The names of the directories must be explicitly identified.

Example:

exclude dir=/export/home/sysadmin/test

The above example instructs filelist to exclude /export/home/sysadmin/test directory.

inventory: This attribute tells the database whether this survey is for the whole system or only part of it.

Example:

inventory=full

The above example instructs the database server to treat the output of filelist be the complete file inventory of the whole system. Any previous inventory will be automatically overwritten by the new run. If the value is partial, it instructs the database server to treat the output of filelist as only a partial inventory of the whole system. The database server will update the file inventory information in the database without deleting any file information, which does not exist in this run but exists in the previous run of the data collection program user: specifies the name of the user to execute filelist. The filelist data collector will become user before executing filelist data collector.

Example:

user=john

[filelist:hostname.domain]: mark the beginning of the host specific attributes for the filelist data gatherer. The same attributes are specified as [filelist]. Note that the attributes following the [filelist:hostname.domain] construct only apply to that specific host. The values specified for these attributes are used in union with the values previously specified for all hosts.

[gts]: marks the beginning of gts specific attributes:

exclude pkgs: the packages where gts should not be run. The wildcard (*), which is a symbol that stands for one or more unspecified characters, is accepted.

Example:

exclude pkgs=SUNW*,TAD*,TWS*,TSBW*

The above example instructs gts to exclude all SUN packages.

exclude dir: the directories that should not be included in the gts test. The wildcard (*) is accepted.

Example:

exclude dir=/var/sadm

The above example instructs gts not to process any binaries under /var/sadm directory.

user: specifies the name of the user to execute gts. The gts data collector will become user before executing gts data collector.

Example:

user=john

Please note that filelist is a pre-requisite for gts; i.e., the user can't use gts without using filelist.

[gts:hostname.domainname]—mark the beginning of host specific attributes for gts data gatherer. The same attributes are specified as [gts]. Note that the attributes following the [gts:hostname.domainname] construct only apply to that specified host. The values specified for these attributes are used in union with the values previously specified for all hosts.

Example:

tests.config run test=installdate, sysconfig, kernelInfo run test=explorer upload test=sysconfig,explorer

[filelist]

exclude dir=/var,/export/home md5 max size=100000000 user=sei inventory=full

[filelist:cheerio.canada.sun.com]

include dir=/usr/local,

/net/netapp/export

[gts]

exclude dir=/var/sadm exclude pkgs=SUNW*,TAD*,TWS*,TSBW* user=sei

[gts:cheerio.canada.sun.com]

exclude dir=/usr/local

D. Conclusion

In conclusion, the present invention provides a novel system and method for collecting and reporting system configuration data to users. While a detailed description of presently preferred embodiments of the invention has been given above, various alternatives, modifications, and equivalents will be apparent to those skilled in the art. For example, specific examples of configuration files are given above, one skilled in the art will appreciate that any suitable configuration file format and content can be used without departing from the spirit of the invention. Therefore, the above description should not be taken as limiting the scope of the invention, which is defined by the appended claims.

What is claimed is:

1. In a network of devices, a method for monitoring the configuration and/or status of said devices, comprising the steps of:

launching a device monitoring tool on at least one of said devices on said network;

said monitoring tool launching one or more data collectors on one or more target devices, said target devices being the devices on the network that are to be monitored;

said data collectors collecting status and configuration data about target devices and passing said data back to said monitoring tool;

said monitoring tool uploading said data to a central site, wherein the uploading comprises splitting the data into multiple data chunks and transmitting the data chunks separately to the central site, the transmitting comprising transferring each of the data chunks over a link in the network between the at least one of said devices and the central site according to a transfer protocol wherein each of the data chunks may be subject to packetization;

at the central site, merging the data chunks to create a data file; and at said central site, loading said data file into a database;

wherein the monitoring tool is further adapted for listening to a storage location at the at least one of the devices to determine if the storage location has an available data file comprising at least a portion of said data from the data collectors and when determined available, initiating the unloading of said available data file to the central site.

2. The method as recited in claim 1, further comprising the step of accessing said database to obtain information about said target devices.

3. The method as recited in claim 2, wherein said step of accessing said database comprises the steps of:
using a web browser, sending a request for information to said central site via the Internet;
at said central site, issuing a command to the database to retrieve the requested information; and
sending the retrieved information back to the web browser via the Internet.

4. The method as recited in claim 3, further comprising the step of formatting the retrieved information into a report format prior to the step of sending the retrieved information back.

5. The method as recited in claim 1, further comprising the step of accessing a configuration file to determine which data collectors are to be run on which target devices.

6. The method as recited in claim 1, further comprising the steps of:
said monitoring tool communicating with the central site to determine if newer releases of the monitoring tool or the data collectors exist, or to determine if there are additional data collectors; and
if newer releases exist or if there are additional data collectors, downloading the newer releases or additional data collectors from the central site.

7. The method as recited in claim 1, further comprising the step of:
prior to launching the one or more data collectors on the one or more target devices, starting a remote analysis program on the one or more target devices, the remote analysis program for monitoring and managing the execution of the data collectors on the one or more target devices.

8. A system for monitoring the configuration and/or status of devices on a network, comprising:
a monitoring application to be run on a first device on the network, said monitoring application being configured to coordinate the monitoring of one or more target devices on the network;
data collector modules to be run on the one or more target devices, the data collector modules being configured to collect configuration and/or status data about said target devices, said data collector modules being launched on said one or more target devices by said monitoring application and said monitoring application accessing a configuration file to determine which of the data collector modules to run on which ones of the target devices; and an upload application to be run on said first device, said upload application being configured to receive said data from said data collector modules and upload the data to a central site,
wherein the upload application listens to a storage location at the first device to determine if the storage location has an available data file comprising at least a portion of said data from said data collector modules and when determined available, initiating the uploading of the data to the central site.

9. The system as recited in claim 8, further comprising a remote analysis application to be run on said one or more target devices, said remote analysis application being started on said one or more target devices by said monitoring application, said remote analysis application being configured to monitor and manage the execution of the data collectors on said one or more target devices.

10. The system as recited in claim 8, wherein said data is stored at said first location, and wherein said first location comprises a graphical user interface for viewing said data.

11. The system as recited in claim 8, further comprising means for accessing said data at said central site.

12. The system as recited in claim 8, wherein said monitoring application is configured to communicate with the central site to determine if a newer release of the system is available, and if a newer release of the system is available, said monitoring application being configured to download and install the newer release of the system.

13. A method for monitoring a set of information for a plurality of computer devices linked to a digital communications network, comprising:
starting a data collection tool on a one of the network devices;
retrieving a configuration file with the data collection tool;
using the configuration file to identify a set of the network devices to be monitored;
running one or more data collectors on the identified network devices, each of the data collectors collecting differing sets of information for a corresponding one of the identified network devices;
transmitting the collected set of information from the identified network devices to the data collection tool on the one of the network devices; and
operating an upload tool on the one of the network devices to listen to a storage location at the one of the network devices to determine if the storage location has an available data file comprising at least a portion of the collected set of information and when determined available, uploading the available data file to a central site over a communications network.

14. The method of claim 13, wherein the configuration file comprises a listing of the data collectors to be run on each of the identified network devices.

15. The method of claim 13, wherein the configuration file comprises a listing of the differing sets of the information to be included in the passed collected set of information.

16. The method of claim 13, wherein the using of the configuration file to identify the network devices to be monitored comprises obtaining a list of remote hosts names from a name service.

17. The method of claim 16, further wherein the using of the configuration file comprises applying filter rules to the list of remote hosts names and including only the remote host names in the list that comply with the filter rules in the identified network devices.

18. The method of claim 5, wherein the configuration file defines a size of the data chunks.

* * * * *